United States Patent
Hatakeyama

(10) Patent No.: US 8,001,390 B2
(45) Date of Patent: Aug. 16, 2011

(54) METHODS AND APPARATUS FOR SECURE PROGRAMMING AND STORAGE OF DATA USING A MULTIPROCESSOR IN A TRUSTED MODE

(75) Inventor: Akiyuki Hatakeyama, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 336 days.

(21) Appl. No.: 11/746,412

(22) Filed: May 9, 2007

(65) Prior Publication Data

US 2008/0282093 A1 Nov. 13, 2008

(51) Int. Cl.
  *G06F 12/14* (2006.01)
  *G06F 21/00* (2006.01)
  *G06F 21/02* (2006.01)
  *G06F 21/22* (2006.01)
(52) U.S. Cl. ......... 713/190; 713/189; 713/193; 710/22; 710/23; 711/163; 711/170; 711/167; 711/145; 711/152; 709/212
(58) Field of Classification Search .......... None
  See application file for complete search history.

(56) References Cited

U.S. PATENT DOCUMENTS

| | | | |
|---|---|---|---|
| 6,526,491 B2 | 2/2003 | Suzuoki et al. | |
| 7,401,358 B1 * | 7/2008 | Christie et al. | 726/21 |
| 7,496,966 B1 * | 2/2009 | McGrath et al. | 726/27 |
| 7,543,293 B2 * | 6/2009 | Willman | 718/100 |
| 2004/0255169 A1 * | 12/2004 | Little et al. | 713/202 |
| 2005/0071651 A1 * | 3/2005 | Aguilar et al. | 713/189 |
| 2005/0081203 A1 * | 4/2005 | Aguilar et al. | 718/100 |
| 2007/0183418 A1 * | 8/2007 | Riddoch et al. | 370/389 |
| 2008/0072236 A1 * | 3/2008 | Pope et al. | 718/108 |

OTHER PUBLICATIONS

Sony, Cell Broadband Engine Architecture, http://cell.scei.co.jp/e_download.html (Aug. 8, 2005).
Sony, Cell Broadband Engine Architecture, http://cell.scei.co.jp/e_download.html (Oct. 3, 2006).

* cited by examiner

*Primary Examiner* — Syed A. Zia
(74) *Attorney, Agent, or Firm* — Matthew B. Dernier, Esq.; Gibson & Dernier LLP

(57) ABSTRACT

Methods and apparatus provide for: entering a secure mode in which a given processor may initiate a transfer of information into or out of said processor, but no external device may initiate a transfer of information into or out of said processor; and programming at least one trusted data storage location using a direct memory access (DMA) command to be one of read-only, write-only, readable and writeable, limited access, and reset, where said at least one trusted data storage location is located external to said processor.

18 Claims, 9 Drawing Sheets

METHODS AND APPARATUS FOR SECURE PROGRAMMING AND STORAGE OF DATA USING A MULTIPROCESSOR IN A TRUSTED MODE

BACKGROUND OF THE INVENTION

In recent years, there has been an insatiable desire for faster computer processing data throughputs because cutting edge computer applications are becoming more and more complex, and are placing ever increasing demands on processing systems. Graphics applications are among those that place the highest demands on a processing system because they require large numbers of data accesses, data computations, and data manipulations within relatively short time periods to achieve desirable visual results. Real-time, multimedia applications also place a high demand on processing systems; indeed, they require extremely fast processing speeds, such as many thousands of megabits of data per second.

While some processing systems employ a single processor to achieve fast processing speeds, others are implemented utilizing multi-processor architectures. In multi-processor systems, a plurality of sub-processors can operate in parallel (or at least in concert) to achieve desired processing results. It has also been contemplated to employ a modular structure in a multi-processing system, where the computing modules are accessible over a broadband network (such as the Internet) and the computing modules may be shared among many users.

A problem arises, however, when a processing system is used over a network or is part of a shared resource. In particular, the processor and its associated software are subject to outside influences such as intentional hacking and the like. Moreover, a processor may access a data storage region which contains malicious executable code or obsolete and/or inaccurate data.

Security measures may be implemented to address these concerns. Specifically, a given processor may be operated in various modes in which access to data within the processor by outside devices is limited and/or in which access to data outside the given processor by the processor is restricted. Such measures may provide increased security and may enable a processor to access data within a data storage region internal to the processor with confidence that the data and/or code therein is reliable.

While the above measures address some security concerns, it may be desirable to extend the security of a processor to trusted storage locations in a system. Co-pending U.S. patent application Ser. No. 11/746,338, filed, May 9, 2007, entitled "METHODS AND APPARATUS FOR ACCESSING RESOURCES USING A MULTIPROCESSOR IN A TRUSTED MODE", (the entire disclosure of which is incorporated herein by reference) addresses this concern by providing a trusted storage facility in a multi-processing system. It has been discovered, however, that by expanding the capabilities of the trusted storage facility, e.g., by permitting that the trusted storage facility be programmable, yields further beneficial results, such as improved intra- and inter-processor collaboration in manipulating sensitive data.

Accordingly, there are needs in the art for new methods and apparatus for providing trusted data storage space in a multi-processing environment.

SUMMARY OF THE INVENTION

In accordance with one or more embodiments, the present invention contemplates a technique for providing a programmable trusted area in which a secure processor may store data and/or retrieve data. A secure processor is one in which the processor will not service an externally generated request to store data within or read data from the processor. The secure processor, however, may itself initiate such data transfers.

The programmable trusted area may be a memory (such as an SRAM, DRAM, etc.), one or more registers, etc. Preferably, the trusted area is implemented using one or more memory mapped input/output registers, where the secure processor may: (i) program the trusted area, and (ii) write/read data to/from the trusted area, using direct memory (DMA) access techniques. The DMA command set preferably dictates that one or more bits of a DMA command identify the command as being initiated by a secure processor (as opposed to a non-secure processor). The programmable trusted area preferably includes dedicated hardware (or firmware) that permits the secure processor to configure (program) the trusted area, such as to make it readable only, writable only, readable and writable, no access, limited access, reset, etc. The dedicated hardware (or firmware) may also be operable to test an incoming DMA command to determine: (i) whether the specified address in the DMA command is associated with the trusted area; and (ii) if the inquiry as to (i) is affirmative, whether the bits of the DMA command indicate that the originating processor is in a secure mode. If the initiating processor is in the secure mode, then the programmability and/or data access is, or is not, permitted depending on further criteria.

The programming of the trusted area preferably occurs prior to a transition in the secure processor between content authentication and content execution/manipulation. For example, once in the secure mode, the processor may authenticate software and/or data (content) before the processor transitions to executing such software. To achieve the transition, trusted decryption code (and a trusted decryption key) may be stored in a secure memory (e.g., a flash ROM) and may be available from the flash ROM only when the processor has entered the secure mode. The trusted decryption code may be used to decrypt a public key authentication program (which may have been encrypted using the trusted key and stored in a system memory). The public key authentication program may be used to decrypt and authenticate content that has been encrypted using a trusted key (e.g., a private key of a private/public key pair). The secure processor may use a public key (e.g., the public key of the private/public key pair) to decrypt and verify the content. The application program and/or data may also be electronically signed, which may also be verified by the public key authentication program. Once authenticated, the secure processor may transition to executing or otherwise manipulating the content. Prior to such transition, however, the programming of the trusted area preferably occurs.

The above (with or without the secure functional transition) permits the secure processor to create some secure data, or to receive some sensitive information during execution of the content, and store same in the trusted area for later retrieval. Examples of such sensitive information include: customer account information, identification numbers, access codes, secure data, random numbers used for secure communications, etc. The list of such information is seemingly endless. Storing sensitive information the trusted area for later retrieval is particularly useful when the processor must leave the secure mode for some period of time, return to the secure mode thereafter, and then use the sensitive information again. One of the many applications of this process is when communication links are used to carry out automated remittance procedures.

In accordance with one or more embodiments of the present invention, methods and/or apparatus provide for: entering a secure mode in which a given processor may initiate a transfer of information into or out of said processor, but no external device may initiate a transfer of information into or out of said given processor; and programming at least one trusted data storage location using a direct memory access (DMA) command to be one of read-only, write-only, readable and writeable, limited access, and reset, where said at least one trusted data storage location is located external to said given processor.

The methods and/or apparatus may further provide for inserting one or more authorization codes into the DMA command, wherein the one or more authorization codes specify the programming of the at least one trusted data storage location. The read-only programming provides that one or more processors may only read contents of the trusted storage location if an accepted one or more authorization codes are presented in a subsequent DMA command. The write-only programming provides that one or more processors may only write contents into the trusted storage location if an accepted one or more authorization codes are presented in a subsequent DMA command. The read/write programming provides that one or more processors may read or write contents of the trusted storage location if an accepted one or more authorization codes are presented in a subsequent DMA command. The limited access programming provides that only a specified processor or processors may access the trusted storage location if an accepted one or more authorization codes are presented in a subsequent DMA command. The resetting a given trusted storage location provides for overriding a previously programmed condition.

The methods and/or apparatus may further provide for: sending the DMA command from said processor to said trusted data storage location; interrogating said one or more authorization codes; and permitting programming of the at least one trusted data storage location if the one or more authorization codes satisfy one or more conditions.

The one or more conditions may be that the processor is in the secure mode. Preferably, the given processor is permitted to insert the one or more authorization codes into the DMA command only when it is in the secure mode.

The one or more conditions may include that the given processor is a first processor to present the one or more authorization codes for programming the at least one trusted data storage location.

At least one of one or more trusted data storage locations and respective groups of such locations may be associated with one or more program authority codes. In such case, the one or more conditions may include that the one or more authorization codes include a valid program authority code.

One or more processors may be associated with one or more processor IDs. In such case, the one or more conditions may include that the one or more authorization codes include a valid processor ID.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
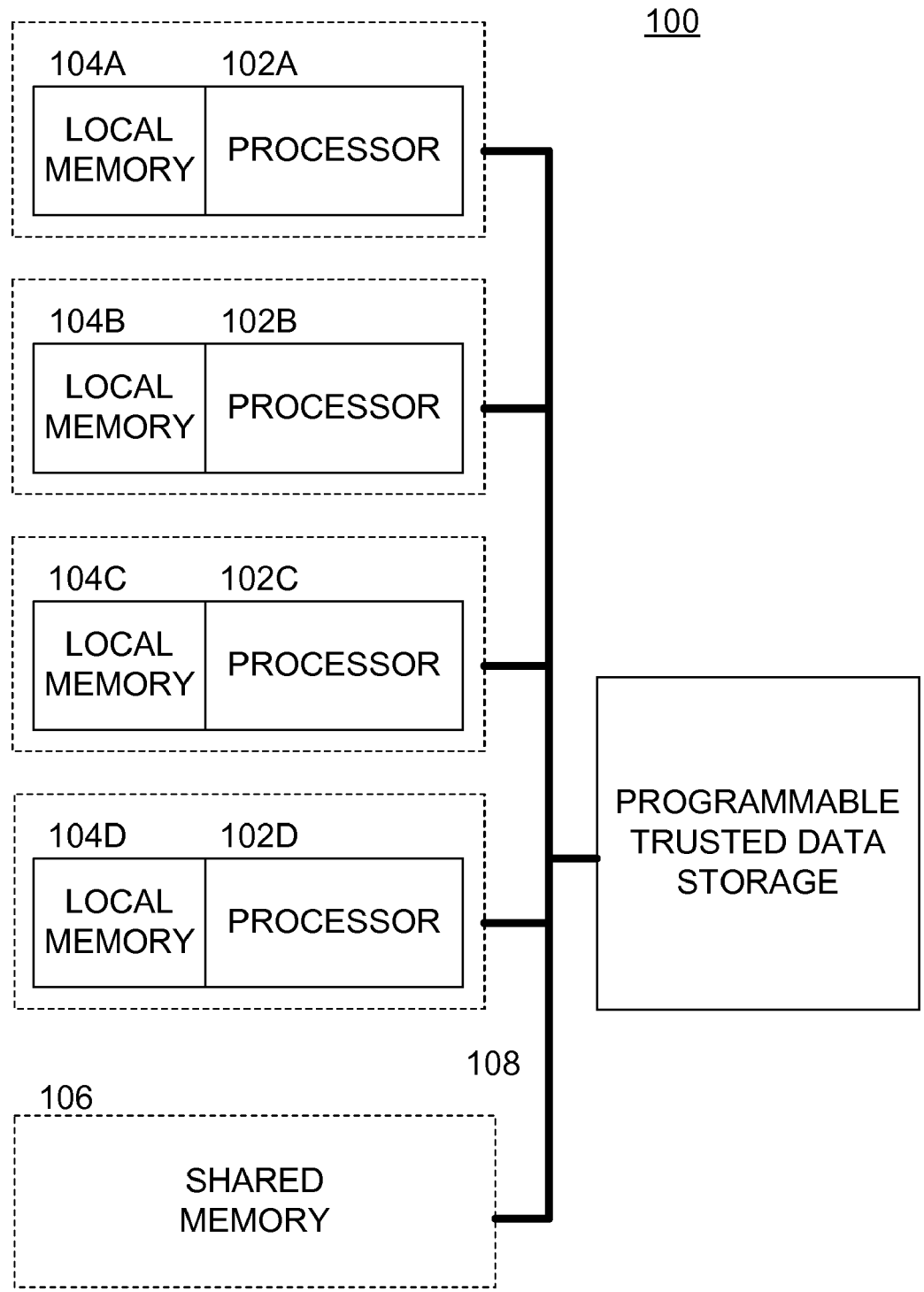
FIG. 1 is a block diagram of a multiprocessing system including a plurality of processors operable to access one or more trusted data storage regions in accordance with one or more embodiments of the present invention.

FIG. 1 is a block diagram of a multiprocessing system 100 in accordance with one or more embodiments of the present invention. While the discussion of FIG. 1 is mostly directed to the description of a system, one or more of the drawing components therein may also be used to illustrate one or more method steps in accordance with one or more further embodiments of the present invention.

The system 100 preferably includes a plurality of processors 102A-D, associated local memories 104A-D, and a shared (or main or system) memory 106 interconnected by way of a bus 108. The system 100 also includes at least one programmable trusted data storage region 130.

Although four processors 102 are illustrated by way of example, any number may be utilized without departing from the spirit and scope of the present invention. Each of the processors 102 may be of similar construction or of differing construction. The processors 102 may be implemented utilizing any of the known technologies that are capable of requesting data from the system memory 106, and manipulating the data to achieve a desirable result. For example, the processors 102 may be implemented using any of the known microprocessors that are capable of executing software and/or firmware, including standard microprocessors, distributed microprocessors, etc. By way of example, one or more of the processors 102 may be a graphics processor that is capable of requesting and manipulating data, such as pixel data, including gray scale information, color information, texture data, polygonal information, video frame information, etc.

It is noted that as used herein, the term "data" is broadly construed to include any type of program code, application software, system level software, any type of data, a data stream, etc.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

The trusted data storage region 130 is preferably programmable and accessible (via data read and/or write) by a secure processor. A secure processor is one in which the processor will not service an externally generated request to store data within or read data from the processor. The secure processor, however, may itself initiate such data transfers. The secure processor 102 is in contrast to a processor in a normal mode, whereby the processor 102 and any external device or devices may initiate a transfer of data into or out of the processor 102, e.g., into or out of the local memory 104. The programmable trusted area may be a memory (such as an SRAM, DRAM, etc.), one or more hardware registers, etc. Preferably, the trusted area is implemented using one or more memory mapped input/output registers, where the secure processor may: (i) program the trusted area, and (ii) write/read data to/from the trusted area, using direct memory (DMA) access techniques.

Figure 2:
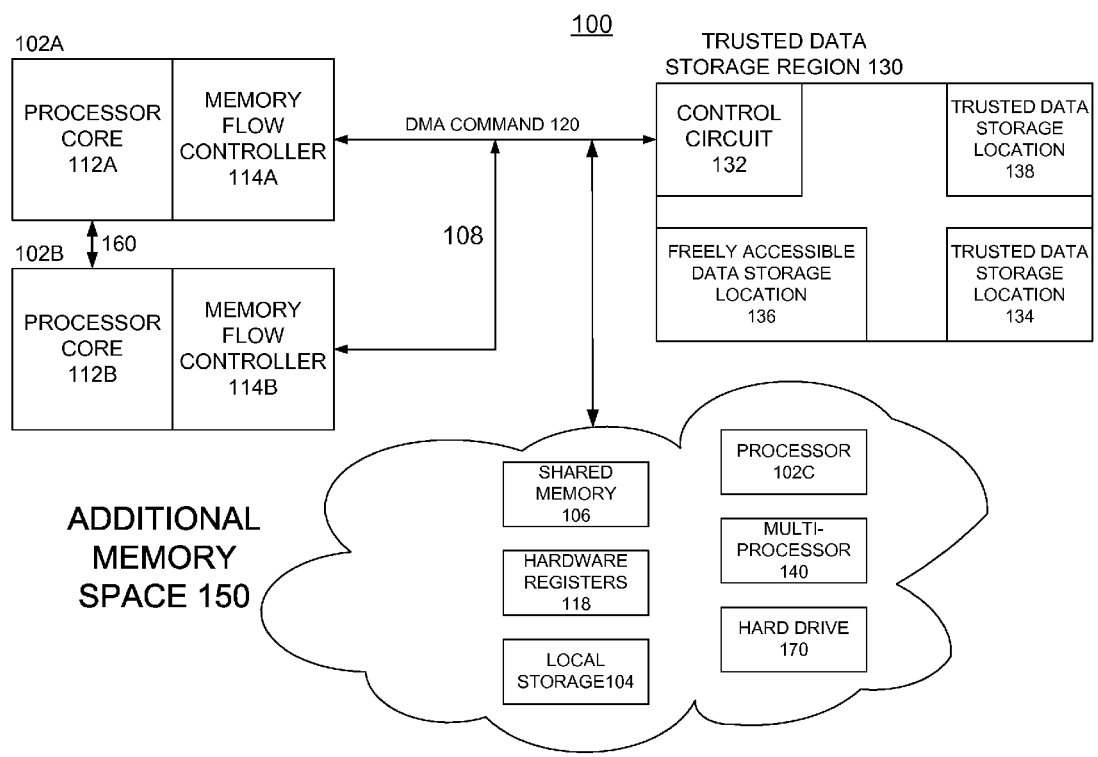
FIG. 2 is a more detailed block diagram of the multiprocessing system of FIG. 1.

In this regard, reference is now made to FIG. 2, which is a more detailed block diagram of the system 100 of FIG. 1. The trusted data storage region 130 along with an additional memory space 150 are shown as being part of an overall memory space of the system 100.

In one or more embodiments, each processor 102 may include a processor core 112 and a memory flow controller 114. Processor core 112 may include a central processing unit (CPU) and/or other hardware for providing data access requests to copy data (which may include program data) from the system memory 106 over the bus 108 into their respective local memories 104 (FIG. 1) and for program execution and data manipulation.

The processor cores 112 are preferably implemented as reduced instruction set computers (RISC), where each processor core 122 includes at least one processing pipeline. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

Although not shown, various alternative embodiments of the system 100 may include an Input/Output (I/O) interface for inputting and outputting data from/to various circuits and/or peripheral devices, a memory interface for managing access to data residing in main or shared memory 106, such data being requested by the processors 102. Portions of the data and program code executed and/or manipulated by the processors 102 are typically swapped into and out of local memories 104 during fetch, decode and/or execution cycles. Access to the data and program code residing in the main memory 106 is managed by the memory interface.

Memory flow controller 114 preferably includes a direct memory access controller (DMAC) and is preferably operable to coordinate direct transfer of data between memories, memory-mapped registers, etc. accessed by the given processor 102 and the data storage space within processor 102 (such as the local memory 104), in response to DMA commands 120. The terms "DMA request" and "DMA command" may be used interchangeably herein.

There are two principal commands that can be issued by a processor for execution by the DMA controller (DMAC): loading (reading data) and storing (writing data). Depending upon the devices within a data processing system 100, a processor 102 may have the ability to load from and/or store to various devices including but not limited to Input/Output (I/O) registers, other hardware registers, another processor's local memory 104, and/or a main memory 106. The data flow starts from the processor core 112, which may dispatch a DMA command 120, which command 120 may be stored in a DMA command queue (not shown). Each DMA command 120 may be unrolled (separated) into a smaller bus request for communication to a bus interface unit (BIU, not shown). The resulting unrolled request may be stored in the BIU outstanding bus request queue. The BIU may then forward the request to a bus controller (not shown). The requests are preferably transmitted out of the BIU in the order in which they were received from the DMAC. Once a bus request is completed, the BIU outstanding bus request queue entry is generally available to receive a new DMA request.

As will be discussed in more detail below, the DMA command set preferably includes the capability of identifying a given DMA command as being initiated by a secure processor (as opposed to a non-secure processor), and identifying the DMA command as permitting the programming of, and/or access to, trusted data storage region 130. Unlike DMA commands that do not relate to the trusted data storage region 130, the DMA command 120 also preferably specifies a physical memory address which has not been and cannot be subject to alteration either by a memory address offset or by memory address translation.

It will be appreciated that in one or more embodiments, system 100 may include a plurality of trusted data storage regions. For example, a trusted data storage region may be located in one or more hardware registers 118, shared memory 106, local storage 104, another storage location within multiprocessor system 100, another processor 102C, hard drive 170, etc. Further, one or more trusted data storage regions may be located in the same multiprocessor system 100 or in another system (not shown) that may be accessed over a network.

Trusted data storage region 130 may include at least one control circuit 132, one or more trusted data storage locations 134 and 138, and one or more freely accessible data storage locations 136. Although two trusted data storage locations 134, 138 are shown within storage region 130, storage region 130 may include fewer or more than two such trusted data storage locations. While access to the trusted storage locations 134, 138 require elevated scrutiny before being permitted by the control circuit 132 (as will be discussed further below), access to the at least one freely accessible data storage location 136 may be obtained without a need for elevated scrutiny.

In one or more embodiments, control circuit 132 may serve to control both programming of and access to the one or more trusted data storage locations 134, 138 of the trusted data storage region 130. More particularly, the control circuit 132 is preferably operable to interrogate a received DMA command 120 to determine whether one or more authorization codes are included therein, which codes are associated with either or both of programming and access. It is preferred that the inclusion of a suitable authorization code within a DMA command 120 is indicative that the processor 102 requesting either programming of one or more trusted locations 134, 138 and/or a data access is operating within the secure mode. It is assumed, therefore, that if a suitable authorization code is not included within the DMA command 120, the requesting processor 102 is not operating within the secure mode.

The control circuit 132 is preferably operable to compare one or more authorization codes (if any) accompanying DMA commands 120 to one or more predetermined codes. If a match exists, then the control circuit 132 may enable the requesting processor 102 to either program the operation of, and/or to load or store data from/to, one or more of trusted storage locations 134, 138. For example, by including appropriate authorization code(s) within one or more DMA commands 120, the processor 102 is preferably operable to program the operation of a given trusted storage location to be one of: read-only (or load-only), write-only (or store-only), read/write (or load/store), no access, limited access, and reset. Read-only programming provides that a secure processor 102 may only read (load) the contents of the trusted storage location if the correct authorization code is presented in a DMA access command 120 (data writing would not be permitted). Write-only programming provides that a secure processor 102 may only write (store) contents into the trusted storage location if the correct authorization code is presented in a DMA access command 120 (data reading would not be permitted). Read/write programming provides that a secure processor 102 may read (load) or write (store) contents of the trusted storage location if the correct authorization code is presented in a DMA access command 120. No access programming provides that no secure processor 102 may access the trusted storage location even if an authorization code is presented in a DMA access command 120. Limited access programming provides that only some secure processors 102 may access the trusted storage location (e.g., read, write, read/write, etc.) if a correct authorization code is presented in a DMA access command 120. Resetting a given trusted storage location provides for overriding a previously programmed condition, thereby permitting the trusted storage location to be re-programmed.

The above programmable operations are intended to apply to processors 102 other than the processor 102 that programs the trusted storage location. In other words, the programming processor 102 preferably retains full access/programming rights (e.g., the ability to read/write) as to the trusted storage location even after it has been programmed (e.g., read-only, write-only, no access, or limited access) and/or to re-program the trusted storage location after it has been programmed (e.g., through a reset and then subsequent programming step).

Control circuit 132 may include hardware, firmware running on a processor, and/or a combination of hardware, firmware, and/or software for performing comparisons between the authorization code(s) contained within the DMA command 120 with one or more predetermined codes. For example, there may be one or more authorization codes within the DMA command 120 containing a string of bits that indicate at least a desire to program the trusted storage location 134 to be read-only. The control circuit 132 is preferably operable to compare the authorization code within the DMA command 120 with a predetermined code. Assuming a match exists, then the control circuit 132 may permit the programming of the trusted storage location 134 or perform other interrogation steps. The programming and data access interrogation capabilities of the control circuit 132 will be discussed in more detail below.

The control circuit 132 may perform the above-described functions within a single physical circuit or functional block, or by way of distributed functional blocks. For example, one functional block may be for evaluating the authorization code (s) for programming, and another functional block may be for evaluating a requesting processor's authorization to perform a particular data storage operation (e.g., a data access) at a specified trusted data storage location.

Figure 3:
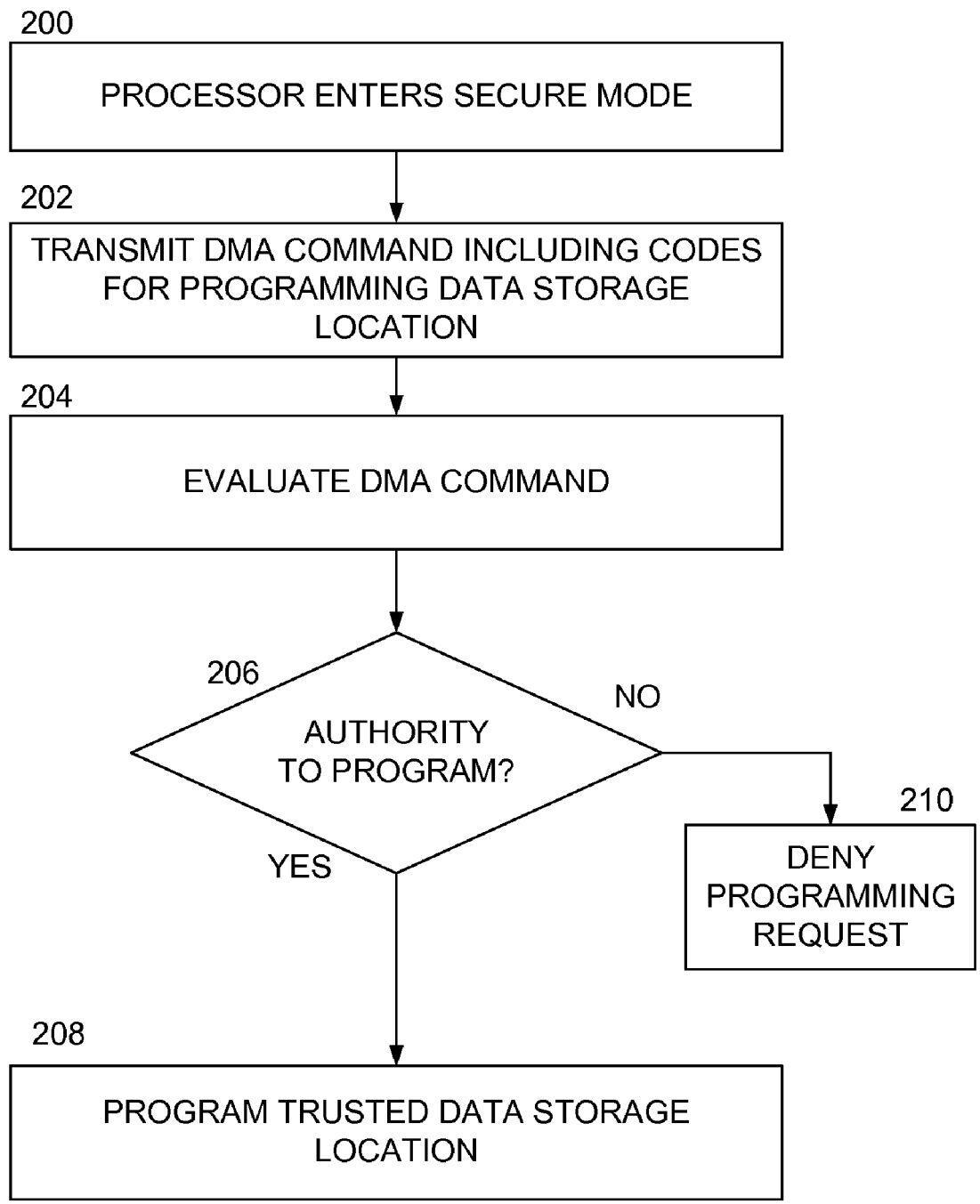
FIG. 3 is a flow diagram of a method for programming a trusted data storage location within a trusted data storage region by a processor in accordance with one or more embodiments of the present invention.

Reference is now made to FIG. 3, which is a flow diagram of a method for programming a trusted data storage location (e.g., location 134) within trusted data storage region 130 by a processor 102 in accordance with one or more embodiments of the present invention. At action 200, processor 102 may enter the secure mode. (Recall that, when in the secure mode, the processor 102 may initiate a transfer of information into or out of the processor 102, but no external device or devices may initiate a transfer of information into or out of the processor 102). The secure mode provides an elevated level of security as to the data manipulations that occur within the processor 102 and, as will be discussed below, elevated security with respect to programming and/or accessing trusted storage location 134. To ensure even higher levels of security and functionality with respect to the trusted storage location 134 (and/or other trusted locations), it is preferred that, while in the secure mode, the memory-mapped input-output registers of memory flow controller 114 are not accessible to entities external to processor 102. It is also preferred that the capability of translating and/or offsetting the address of a DMA command (i.e., using virtual addressing) within memory flow controller 114 is inhibited while in the secure mode (or at least when accessing trusted storage locations). It is noted that operation within the secure mode by processor 102 enables DMA store and load operations requested by processor 102 to be completed once an initial DMA command has been issued by processor 102. The completion of such DMA store and load operations are considered to be transfers of information initiated by processor 102.

At action 202, processor 102 preferably prepares and transmits a DMA command 120 to trusted data storage region 130, which may be interrogated by the control circuit 132 located therein. In this case, the DMA command 120 is preferably not transmitted to effect a transfer of data, but rather to serve as a vehicle for transmitting information (authorization codes) for programming one or more trusted data storage locations, such as location 134.

In one of more embodiments, the DMA command 120 may include one or more authorization codes that may be used to set the operation of a given trusted data storage location (e.g., location 134), such as, as discussed above, one of: read-only (or load-only), write-only (or store-only), read/write (or load/store), no access, limited access, and reset. In the present example, it is assumed that the authorization code(s) indicate the desire to program the trusted data storage location 134 to be read-only.

At action 204, control circuit 132 preferably interrogates the DMA command 120 at least to evaluate the authorization code(s). The interrogation may be related to initiating the process of programming the trusted data storage location 134 or to determine whether such programming should be permitted. In this regard, the authorization code(s) (or some other parameter) may be evaluated to determine whether the processor 120 is authorized or otherwise permitted to program the trusted data storage location 134 specified in the DMA command 120 (e.g. via address). As will be discussed in more detail below, the mechanisms for determining whether the processor 120 is authorized to program the trusted data storage location are varied. Regardless of the specific mechanism for making the determination, if the programming is not permitted (action 206), the process preferably flows to action 210, where the programming request is denied and/or other appropriate actions are taken, such as issuing an error message, which may be returned to processor 102 to indicate the failure.

If the programming request is permitted at action 206, the process flow preferably advances to action 208, where the operation of the trusted data storage location 134 is programmed to be read-only (in this example). In one or more embodiments, this may be achieved via the control circuit 132 evaluating the specific bits of the authorization code to determine that read-only operation is requested for the trusted storage location 134. Thus, while one sequence of bits may specify read-only operation, different sequences of bits may specify write-only, read/write, no access, limited access, and reset.

As discussed above, at actions 204 and 206, the DMA command 120 may be interrogated to determine whether the requesting processor 120 is authorized to program the specified trusted data storage location 134. One of the mechanisms to make this determination is to use a first come, first served protocol in which the first processor to present an authorization code requesting that a given trusted storage location be programmed is granted at action 206. Once programmed, however, a second processor would be denied the authority to program the trusted storage location.

An alternative or additional approach to regulating the ability to program the trusted storage locations 134, 138 is to require the presentation of an acceptable program authority code within the DMA command 120, preferably as part of the authorization code(s). A program authority code may include one or more bits that may be interrogated by the control circuit 132 to determine whether the processor transmitting the DMA command 120 is authorized to program one or more trusted data storage locations within trusted data storage region 130. In one or more embodiments, there may be one or more substantially unique program authority codes for: (i) each trusted data storage location, (ii) respective groups of locations, and/or (iii) respective trusted data storage regions. Thus, a given processor 102, or a select group of processors 102 may be in possession of the unique program authority code(s) needed to program one or more trusted data storage locations. Therefore, the control circuit 132 may discriminate between processors 102 seeking to program a given trusted storage region, a given trusted storage location, etc. by comparing the program authority code(s) provided in the DMA command 120 against a predetermined code or codes associated with the region and/or location(s). It is noted that the use of program authority code(s) may be combined with the aforementioned first come, first served protocol to further discriminate between processors 102 with access to the appropriate program authority code(s), particularly, where a common program authority code is employed to permit access to multiple locations and/or regions.

A further alternative or additional approach to regulating the ability to program the trusted storage locations 134, 138 is to require the presentation of an acceptable identification (ID) of the requesting processor 120 within the DMA command 120, preferably as part of the authorization code (s). Thus, the control circuit 132 may evaluate the processor ID of the requesting processor 102 to determine the authority of the processor 102 to program a trusted data storage location. Notably, the processor ID may also be used in association with the codes specifying the desired operation of the trusted storage location. For example, a requesting processor 102 may program a trusted storage location to permit read-only operation to processor(s) 102 having specific IDs. Additionally or alternatively, the requesting processor 102 may program the trusted storage location to permit, for example, read-only operation to some processor(s) 102 (having certain specific IDs) and write-only operation to the other processor (s) 102 (having other specific IDs). By using the IDs to limit access to trusted storage location(s), the aforementioned limited access programming may be achieved. This would require that the requesting processor 102 obtain the IDs of the processors 102 at issue, although this information may be provided in accordance with application software programs being executed by the participating processors 102.

In one or more embodiments, the limitations on processor access to a trusted data storage location imposed by a processor that has programmed the location via the authorization code apply only to processors other than the processor that performed such programming. Thus, in such embodiments, the processor programming a trusted location is preferably operable to override the programmed operation of the trusted data storage location by virtue of its status as the programming processor for that trusted location. This may be implemented via storing the ID of the programming processor at the control circuit 132 and/or the control circuit 132 providing the programming processor with a special code for later programming and/or access. Preferably, once established, the programmed operation of the trusted data storage location remains in effect, until it is reset, preferably by the programming processor. For example, the programmed operation of a given trusted location may be "no access" for processors other than the programming processor; however, the programming processor may retain full access to the trusted storage location. The above functionality preferably also applies to the other programmable operations in order to enable the programming processor to retain full access rights.

In alternative embodiments, however, even the programming processor may be bound by the programmed constraints on a trusted storage location, once such are established. In this case, a separate overriding code may be needed to reset the programmability of the trusted data storage location to enable the re-programming thereof.

It is noted that the programming actions discussed above are preferably carried out prior to a secure functional transition in the processor 102 from authenticating an application program to executing the application program. Although the embodiments of the present invention are not limited to any theory of operation, it is believed that a higher level of trust as to the integrity of the trusted data storage locations is maintained before execution of an application program is permitted on the processor 102. In this regard, the operating system (OS) of the processor 102 may allocate and program one or more trusted storage locations in the trusted region 130 prior to execution of the application software that would use the trusted storage locations.

In this regard, a process that may be carried out in order to establish a functional transition in the processor 102 from authenticating an application program to executing the application program is disclosed in U.S. Provisional Patent Application No. 60/650,491, the entire disclosure of which is incorporated herein by reference. A summary of this process and its implementation with the programming feature of the present invention will now be provided. An encrypted authentication program is preferably read into the local memory 104 of the processor 102 from a storage medium. As the authentication program is encrypted, it may have been stored in a relatively non-secure storage medium, such as the system memory 106, or a relatively secure storage medium, such as a permanently programmable ROM that is accessible only under certain circumstances.

In one or more alternative embodiments, the processor 102 is preferably operable to enter the secure mode of operation prior to reading in the encrypted authentication program into the local memory 104. In the embodiments employing a secure ROM to store the encrypted authentication program, an additional security feature may be that the ROM 110 may only be accessed when the processor 102 is in the secure mode of operation.

Once the trusted environment provided by the secure mode of operation is achieved, the processor 102 is preferably operable to invoke a decryption unit (which may be a program stored in the secure ROM, or may be a hardware-implemented device, such as a flash ROM that has been programmed utilizing an algorithm defining a decryption process). The decryption unit is preferably employed to invoke a private key (which may have also been stored in the secure ROM). The private key is read into the local memory 104 and the encrypted authentication program is preferably decrypted using the decryption unit and the private key. As the decryption of the authentication program preferably takes place within the trusted environment of the secure processor 102, it may be assumed that the authentication program cannot be tampered with after decryption.

Once the functionality of the processor 102 has transitioned to the authentication program, an encrypted application program is preferably read into the local memory 104 of the processor 102. As the application program has been encrypted, it may be assumed that no unauthorized entity (not properly in possession of the private key) has tampered with the application program. As the authentication program is preferably privy to the private key of the private/public key pair, it is preferably operable to facilitate the decryption of the application program alone or in combination with the decryption unit.

An authentication routine is preferably executed on the decrypted application program using the authentication program to verify the authenticity of the application program prior to its execution by the processor 102. In this regard, the step of verifying the authenticity of the application program may include executing a hash function on the decrypted application program to produce a hash result. Thereafter, the hash result may be compared with a predetermined hash value, which may be the digital signature. The authentication program may include the ability to execute the same hash function that was used to produce the digital signature of the application program. The authentication program may be operable to execute the hash function on the application program to produce the hash result and to compare the hash result with the digital signature. If the hash result and the predetermined hash value match, then it may be assumed that the application program has not been tampered with and is authentic. If a determination that the application program is authentic is affirmative, then the functionality of the processor 102 is preferably transitioned from the authentication program to application program execution.

Prior to such transition, however, the processor 102 is preferably operable to program one or more trusted data storage locations of the trusted data storage region 130 as discussed above with respect to FIG. 3.

Irrespective of whether secure functional transition processing techniques are employed in connection with programming one or more trusted data storage locations, one or more processors 102 are preferably operable to access such trusted data storage locations under certain conditions.

Figure 4:
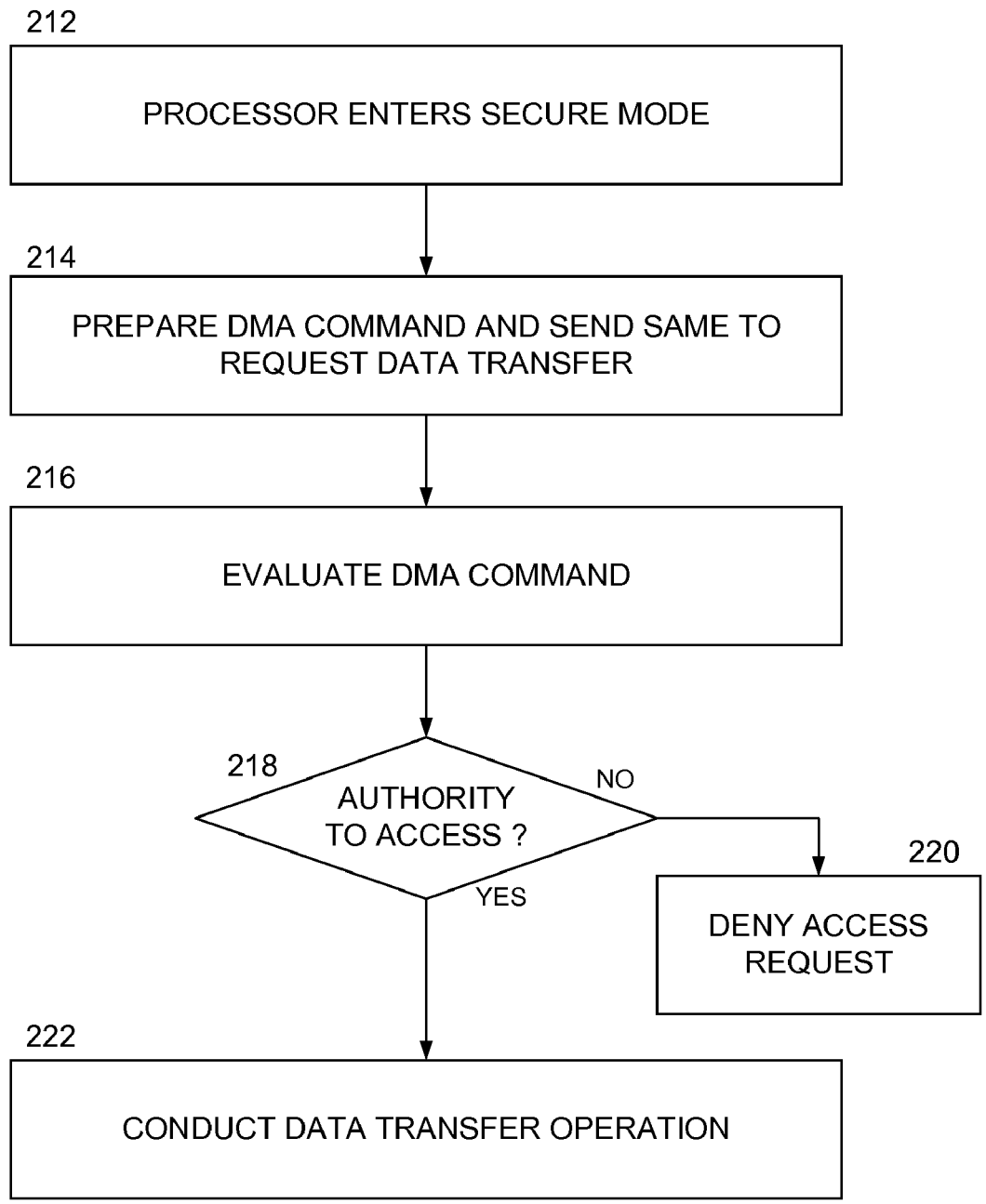
FIG. 4 is a flow diagram of a method for facilitating a data transfer between a trusted data storage location and a processor in accordance with one or more embodiments of the present invention.

Reference is now made to FIG. 4 is a flow diagram of a method for conducting a data transfer operation between processor 102 and trusted data storage region 130 in accordance with one or more embodiments of the present invention. It is noted that certain aspects of the methods and apparatus disclosed in the aforementioned, co-pending U.S. patent application Ser. No. 11/746,338 may be employed to conduct the data transfer operation between the processor 102 and the trusted data storage region 130.

Turning now to preferred process flow, at action 212, processor 102 may enter the secure mode of operation, which mode was described earlier herein. At action 214, processor 102 preferably prepares and sends a DMA command 120 to the trusted data storage region 130 to request a data transfer operation between processor 102 and trusted data storage region 130. The DMA command 120 may include at least an authorization code and the address of the trusted data storage location (e.g., location 134) to which or from which data are to be transferred. It is preferred that the destination address of the DMA command 120 is not subject to address offset or address translation in the memory flow controller 114 when the processor 102 is in the secure mode. In other words, the DMA command 120 preferably specifies a physical address, not a virtual address. The presence of the authorization code within DMA command 120 preferably indicates that processor 102 is operating within the secure mode. This functionality is preferably achieved in hardware or firmware by making the authorization code inaccessible to the processor core 112 unless the processor 102 is in the secure mode. For example, the authorization code may be stored in a secure ROM that is unlocked only when the processor 102 is in the secure mode.

In accordance with one or more embodiments, at least the type of data transfer requested (load or store), the authorization code, and the address of the trusted data storage location 134 may be sufficient to facilitate the requested data transfer operation. In this regard, at action 216, control circuit 132 preferably interrogates the DMA command 120 at least to evaluate the authorization code(s) to determine whether such access should be permitted. In this regard, the authorization code(s) may be evaluated to determine whether the processor 120 is authorized or otherwise permitted to access the trusted data storage location specified in the DMA command 120 (e.g. location 134).

As will be discussed in more detail below, the mechanisms for determining whether the processor 120 is authorized to access the trusted data storage location are varied. Regardless of the specific mechanism for making the determination, if the programming is not permitted (action 218), the process preferably flows to action 220, where the access request is denied and/or other appropriate actions are taken, such as issuing an error message, which may be returned to processor 102 to indicate the failure. If the access request is permitted at action 218, however, the process flow preferably advances to action 222, where the access to the trusted data storage location 134 permitted.

As discussed above, at actions 216 and 218, the DMA command 120 may be interrogated to determine whether the requesting processor 120 is authorized to access the specified trusted data storage location. In one or more embodiments, this may be achieved via the control circuit 132 evaluating the specific bits of the authorization code to determine that the processor 102 is in the secure mode of operation. If the authorization code is present, the control circuit 132 may permit access to the trusted storage location 134. Additionally, the control circuit 132 may evaluate the DMA command 120 to determine that specified access operation is permitted.

For example, the trusted data storage location 134 may have been programmed to be read-only (as discussed above). If the DMA command 120 indicates a data read request (load), and the trusted data storage location 134 is programmed to be, e.g., read-only, then the access is possible and the control circuit 132 may permit such access. On the other hand, if the DMA command 120 indicates a data read request (load), and the trusted data storage location 134 is programmed to be, e.g., write-only, then the access is not possible and the control circuit 132 preferably prohibits such access.

One or more additional access protocols may be used in conjunction or in the alternative to the evaluation above. For example, the presentation of an acceptable identification (ID) of the requesting processor 120 within the DMA command 120, preferably as part of the authorization code(s), may be required. Indeed, as discussed above, the trusted storage location 134 may have been programmed to permit access only to one or more specific processors 102 via the ID. Thus, the control circuit 132 may evaluate the processor ID of the requesting processor 102 to determine the authority of the processor 102 to access the trusted data storage location.

In addition to the above, the control circuit 132 preferably ensures that the data storage location to which access is sought (e.g., location 134) is associated with the trusted data storage region 130. Control circuit 132 may also determine whether an authorization code is needed for the requested access. For instance, if an incoming DMA command 120 seeks access (for either a load or store operation) to freely accessible data storage location 136, an authorization code is generally not needed.

The foregoing process and apparatus permits processors 102 to extend the security that they enjoy internally at least partially to an external storage area. Indeed, at least an elevated level of trust may be associated with the trusted locations of the trusted data storage region 130 because they may only be accessed by processors 102 in a secure mode of operation. This ensures that any data stored in the trusted location are not corrupt.

An example is now considered which employs one or more aspects of the system and method discussed herein. In this example, processor 102A may conduct a transaction with a client (not shown) over the Internet or other broadband network using a VPN to ensure secure communication of sensitive information. By way of example, processor 102A may be executing an application program in which remittance information is being collected from and/or provided to the client to satisfy the conditions for the sale of goods or services over the Internet. During the secure communications between the processor 102A and the client, sensitive information may be transmitted and/or produced, manipulated, etc. in order to conduct the remittance process. For example, in order to implement the VPN between the processor 102A and the client, the processor 102A may generate one or more random numbers for use as the basis of encryption and/or decryption keys. Additionally, the processor 102A may receive a credit card number, social security number, personal identification number, password, etc., from the client. The processor 102A should keep such information confidential and secure.

Circumstances may require that processor 102A interrupt the communication with the client (and leave the secure mode of operation) to attend to a more urgent data processing task. In this situation, it may be desirable to preserve sensitive data associated with the online transaction, such as the online remittance process, to enable efficient resumption of the transaction later, without having to start the transaction all over again.

Preferably, upon learning of an imminent interruption of a transaction, processor 102A discontinues transmitting sensitive information. Although the processor 102A may notify the client that the transaction will be interrupted, for the appearance of a seamless transaction, such notification may be omitted as long as the interruption will not be of significant notice to the client. The processor 102A then preferably gathers the sensitive data associated with the interrupted transaction (again, which may include one or more of a random number used to encrypt information for use over the VPN, the one or more passwords used by the client and/or by the processor 102A, one or more account numbers associated with the transaction, and optionally, marker information indicative of the stage at which the transaction was interrupted, to enable resumption of the transaction with either minimum or no repetition of tasks.

Assuming that a trusted data storage location (e.g., location 134) has not already been programmed, the processor 102A may program the trusted data storage location 134 to be "no-access" in preparation for storing the sensitive data therein. This programming may be conducted in accordance with the method described in connection with FIG. 3 and, for the sake of brevity, the details of the programming steps are not repeated. Making trusted location 134 no-access preferably ensures the security of the sensitive data in between the interruption of the transaction with the client and the resumption thereof. The processor 102A may then store the sensitive data in trusted data storage location 134 using its status as the programming processor to override the no-access data status code for this trusted location.

The processor 102A may then delete data associated with the client transaction from its local memory 104A and any other memory outside trusted data storage location 134. The processor 102A may then leave the secure mode of operation and conduct and complete the activity that interrupted the client transaction. Upon completing the intervening activity, processor 102A may enter the sure mode of operation and resume the client transaction.

Continuing with the example, processor 102A may then load the sensitive data from trusted data storage location 134 into its local memory 104A. The processor 102A may then restore communication with the client by encrypting information for transmission to the client in accordance with the VPN that was previously in effect between processor 102A and the client. In this manner, the transaction with the client can preferably be securely restored without having to restart the transaction from the beginning, while still preserving the security of the data forming part of the transaction.

Once processor 102A has no further need for the sensitive data stored in trusted location 134, processor 102A preferably deletes the data stored therein and then preferably resets the trusted location 134 for later use and/or for use by other processors 102. In this manner, access to trusted location 134 by processors other than processor 102A is granted only once all sensitive data stored therein has been deleted.

Figure 5:
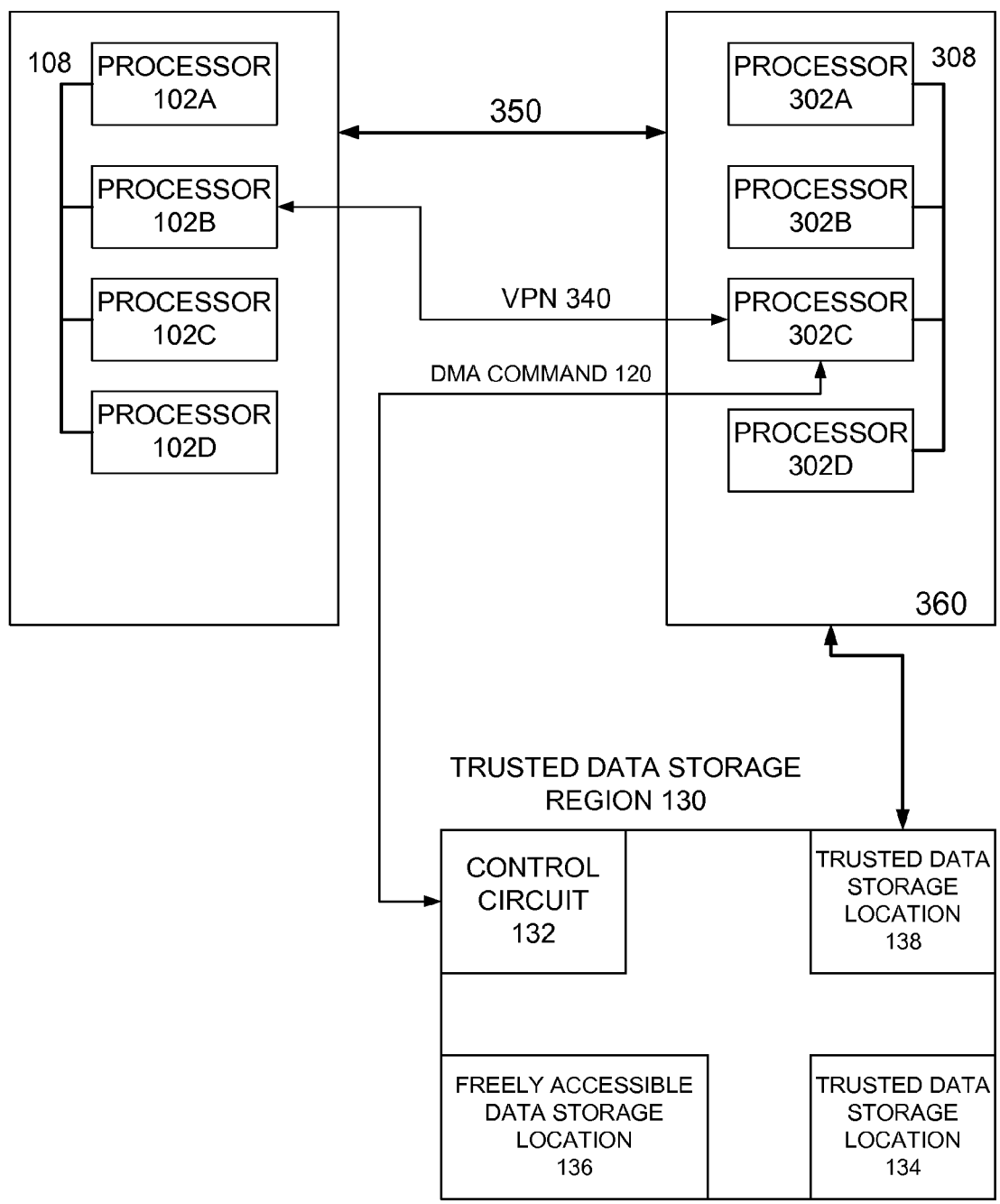
FIG. 5 is a block diagram of a data processing system enabling the programming of and access to a trusted data storage region by a processor over a virtual private network (VPN) in accordance with one or more embodiments of the present invention.

FIG. 5 is a block diagram of a data processing system 300 enabling access by a processor 102 in a first multiprocessor system 310 to a trusted data storage region 130 via an intervening second multiprocessor system 330 over a virtual private network (VPN) 340 in accordance with one or more embodiments of the present invention. Data processing system 300 may include multiprocessor system 310, multiprocessor system 330, communication links 350 and 360, and trusted data storage region 130.

In one or more embodiments, multiprocessor system 310 may include four processors 102A-102D, and data bus 108 for enabling communication between the processors 102.

Multiprocessor system 330 is preferably like multiprocessor system 310 and may include four processors 302A-302D and data bus 308 for enabling communication between the processors 302. The construction and operation of multiprocessor system 330 may be substantially the same as that of multiprocessor system 310.

In one or more embodiments, communication link 350 is preferably disposed between multiprocessor system 310 and multiprocessor system 330 to enable communication therebetween. Communication link 350 may include one or more dedicated hardware connections, one or more data buses, and/or a combination of the foregoing. Communication link 360 may couple multiprocessor system 330 and trusted region 130 to enable communication therebetween. As with communication link 350, communication link 360 may include one or more dedicated hardware connections, one or more data buses, or a combination of the foregoing.

Data processing system 300 preferably includes trusted data storage region 130. However, data processing system 300 could also include one or more additional trusted data storage regions as was discussed above with respect to FIG. 2. The constituent data storage portions of trusted region 130 and the types of physical data storage devices which could include trusted region 130 were discussed in connection with FIG. 1, and that discussion is therefore not repeated in this section.

Figure 6:
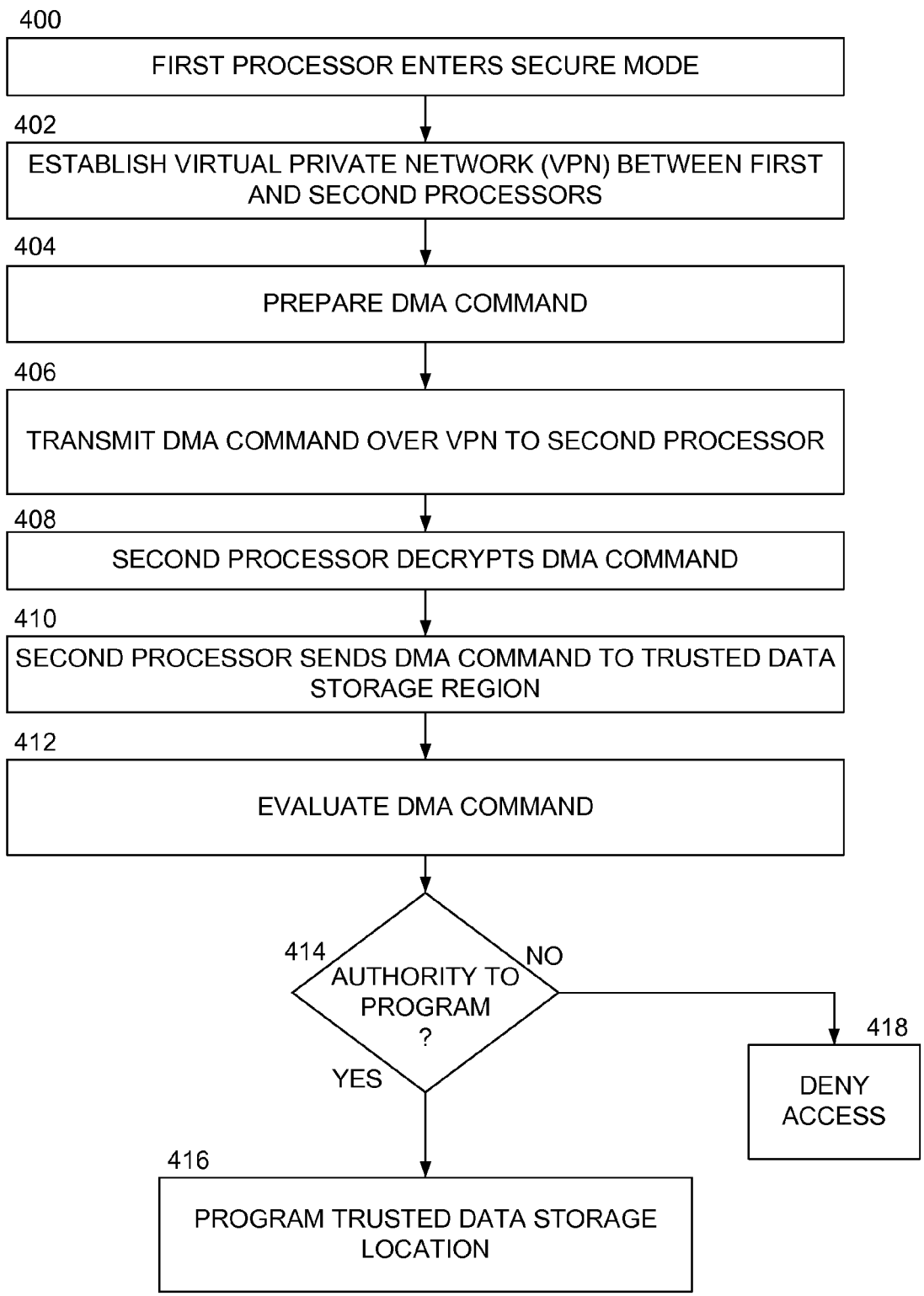
FIG. 6 is a flow diagram of a method for controlling the programming of and access to the trusted data storage region by the processor within the system of FIG. 5 in accordance with one or more embodiments of the present invention.

FIG. 6 is a flow diagram of a method for programming a trusted data storage region 130 by a first processor 102B using at least one intermediate processor 302C in accordance with one or more embodiments of the present invention. At action 400, processor 102B of multiprocessor 310 preferably enters a secure mode of operation. Again, so as to ensure even higher levels of security and functionality with respect to the trusted storage location 134 (and/or other trusted locations), it is preferred that, while in the secure mode, the memory-mapped input-output registers of the memory flow controller 114 of processor 102B are not accessible to entities external to processor 102. It is also preferred that the capability of translating and/or offsetting the address of a DMA command (i.e., using virtual addressing) within memory flow controller 114 is inhibited while in the secure mode (or at least when accessing trusted storage locations).

At action 402, processor 102B preferably establishes a VPN 340 with processor 302C of multiprocessor 330. The actions which may be followed for establishing a VPN are presented below as part of a continuing discussion of action 402: The first processor 102B and the second processor 302C may exchange public keys by transmitting same over communication link 350. Next, the first processor 102B may produce at least one random number. The first processor 102B may encrypt the random number using the public key of the second processor 302C. Thereafter, the first processor 102B may transmit the encrypted random number to the second processor 302C over communication link 350. Thereafter, the second processor 302C may decrypt the random number utilizing its private key, where the private key is paired with the public key thereof. At this point, both the first and second processors 102B, 302C are privy to the same random number, which random number is not accessible by the other processors or external devices unless such access is permitted. Next, the first and second processors 102B, 302C may utilize the random number to encrypt further communication therebetween, thereby establishing a virtual private network between these two processors.

At action 404, processor 102B preferably prepares a DMA command 120 for programming one or more trusted data storage locations (such as location 134). (While trusted location 134 is employed in this discussion, the method disclosed herein is applicable to trusted location 138 and any other similar trusted data storage locations). The details discussed above concerning the DMA command 120 for programming of FIG. 3 apply with equal relevance here. Thus, in one of more embodiments, the DMA command 120 may include one or more authorization codes that may be used to set the operation of the trusted data storage location 134, such as to be one of: read-only, write-only, read/write, no access, limited access, and/or reset. In addition as discussed above, the DMA command 120 may include one or more of a program authority code, an identification (ID) of the processor 120B, all preferably as part of the authorization code(s).

At action 406, processor 102B preferably encrypts the DMA command 120 in accordance with VPN 340 and preferably sends the DMA command 120 over VPN 340 to processor 302C. At action 408, processor 302C preferably decrypts the DMA command 120. At action 410, processor 302C preferably sends the DMA command 120 to trusted data storage region 130.

As previously discussed with respect to FIG. 3, the DMA command 120 may be interrogated (actions 412, 414) by the control circuit 132 to determine whether the requesting processor 120 is authorized to program the specified trusted data storage location 134. In particular, the first served protocol may be employed (in which the first processor to present an authorization code requesting that a given trusted storage location be programmed is granted programming access). Alternatively or in addition, a program authority code may be interrogated by the control circuit 132 to determine whether the processor transmitting the DMA command 120 is authorized to program one or more trusted data storage locations within trusted data storage region 130. Recall that there may be a substantially unique program authority code for each trusted data storage location, respective groups of locations, and/or respective trusted data storage regions. Therefore, the control circuit 132 may discriminate between processors 102 seeking to program a given trusted storage region, a given trusted storage location, etc. by comparing the program authority code(s) provided in the DMA command 120 against a predetermined code or codes associated with the region and/or location(s). Additionally or in the alternative, the control circuit 132 may evaluate the processor ID of the requesting processor 102 to determine the authority of the processor 102 to program a trusted data storage location.

If the programming is not permitted (action 414), the process preferably flows to action 418, where the programming request is denied and/or other appropriate actions are taken, such as issuing an error message, which may be returned to processor 102 to indicate the failure. If the programming request is permitted at action 414, the process flow preferably advances to action 416, where the operation of the trusted data storage location 134 is programmed in the manner specified in the DMA command 120, e.g., read-only, write-only, read/write, no access, limited access, and reset.

Once programmed, data may be stored by or read into the first processor 102B (or any other authorized processor 102) over the VPN 340. This access process is disclosed in detail in the aforementioned, co-pending U.S. patent application Ser. No. 11/746,338.

In one or more embodiments, the functionality of the system of FIG. 5 may be extended to include one or more intermediary processors between processor 102B and processor 302C. In such embodiments, VPNs may be implemented throughout a sequence of processors, of whatever length, leading from the processor requesting the data transfer to the last processor in the sequence, which preferably communicates directly with trusted data storage region 130. Preferably, in this embodiment, data would be prepared at a first processor, encrypted in accordance with the first processor's outgoing VPN, and transmitted to the second processor. Thereafter, each successive processor preferably receives encrypted data, decrypts the data in accordance with its incoming VPN, re-encrypts the data in accordance with its outgoing VPN, and transmits the data to the next processor in the sequence. The last step of the process would preferably be modified for the last processor in the sequence. The last processor preferably receives the data, decrypts the data in accordance with the VPN established between the last and second-to-last processors in the sequence, and then transmits the data, in unencrypted form, to the trusted data storage region.

While the discussion of FIGS. 5-6 is directed to an embodiment involving two processors located on two respective multiprocessor systems (310 and 330), the present invention could be practiced employing fewer or more than two multiprocessor systems. Specifically, a sequence of two or more processors could be located within a single multiprocessor system. Moreover, where a longer sequence of processors is employed, the processors within this chain could be disposed within three or more multiprocessor systems.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi processing computer system are constructed from a common computing module (or cell). This common computing module has a consistent structure and preferably employs the same instruction set architecture. The multi processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi processing computer system, and if a network is employed, the rapid transmission of applications and data over the network. This structure also simplifies the building of members of the network of various sizes and processing power and the preparation of applications for processing by these members.

Figure 7:
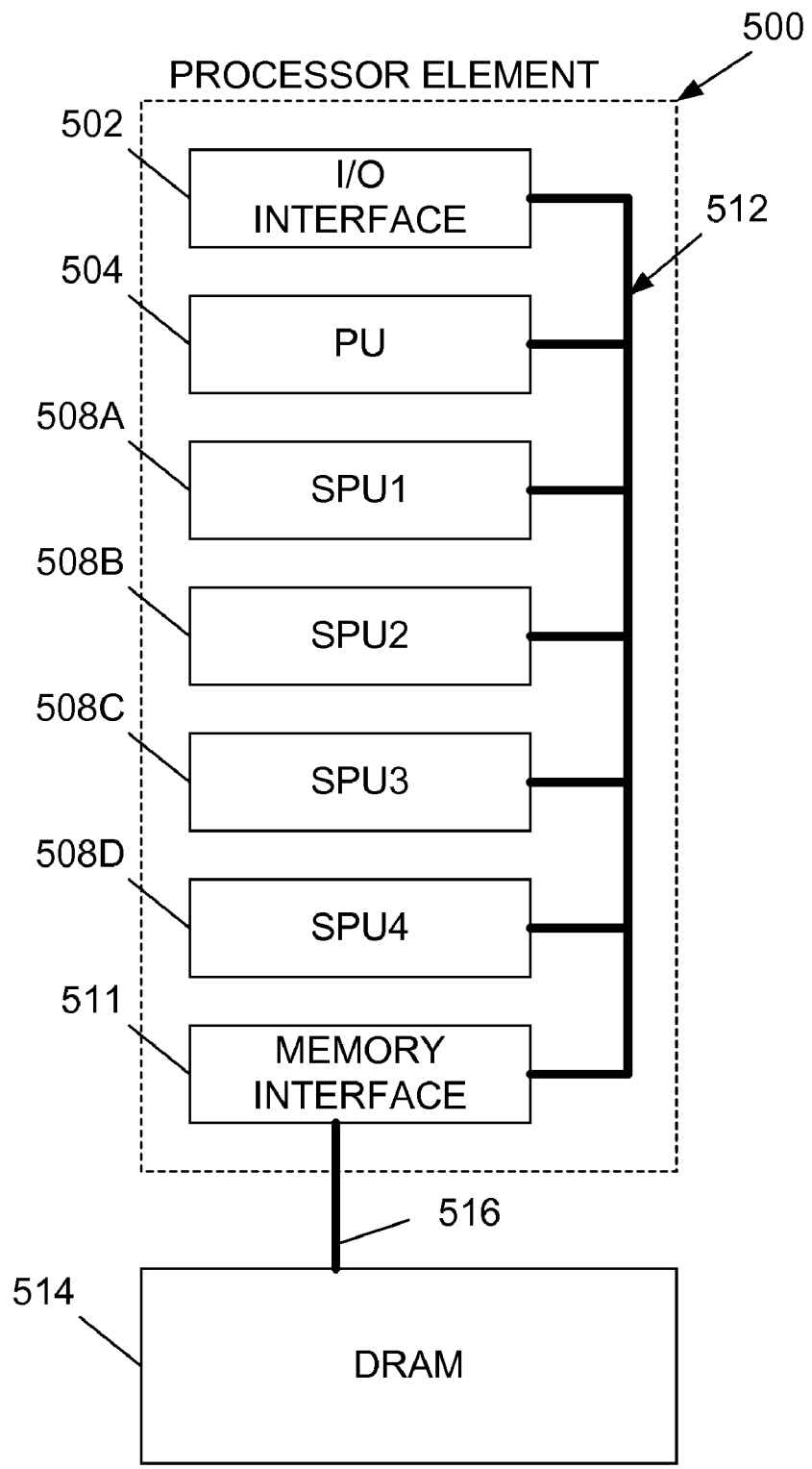
FIG. 7 is a diagram illustrating a preferred processor element (PE) that may be used to implement one or more further aspects of the present invention.

With reference to FIG. 7, the basic processing module is a processor element (PE) 500. The PE 500 comprises an I/O interface 502, a processing unit (PU) 504, and a plurality of sub processing units 508, namely, sub processing unit 508A, sub processing unit 508B, sub processing unit 508C, and sub processing unit 508D. A local (or internal) PE bus 512 transmits data and applications among the PU 504, the sub processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so called III B compounds employing a wide variety of dopants. The PE 500 also may be implemented using superconducting material, e.g., rapid single flux quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub processing units 508 and the PU 504 of the PE 500. It is noted that the DMAC and/or the memory interface 511 may be integrally or separately disposed with respect to the sub processing units 508 and the PU 504. Indeed, the DMAC function and/or the memory interface 511 function may be integral with one or more (preferably all) of the sub processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand alone processing of data and applications. In operation, the PU 504 preferably schedules and orchestrates the processing of data and applications by the sub processing units. The sub processing units preferably are single instruction, multiple data (SIMD) processors. Under the control of the PU 504, the sub processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub processing units 508 taking on the role of a main processing unit that schedules and orchestrates the processing of data and applications by the sub processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub processing units of a PE 500 assigned to processing a particular software cell depends upon the complexity and magnitude of the programs and data within the cell.

Figure 8:
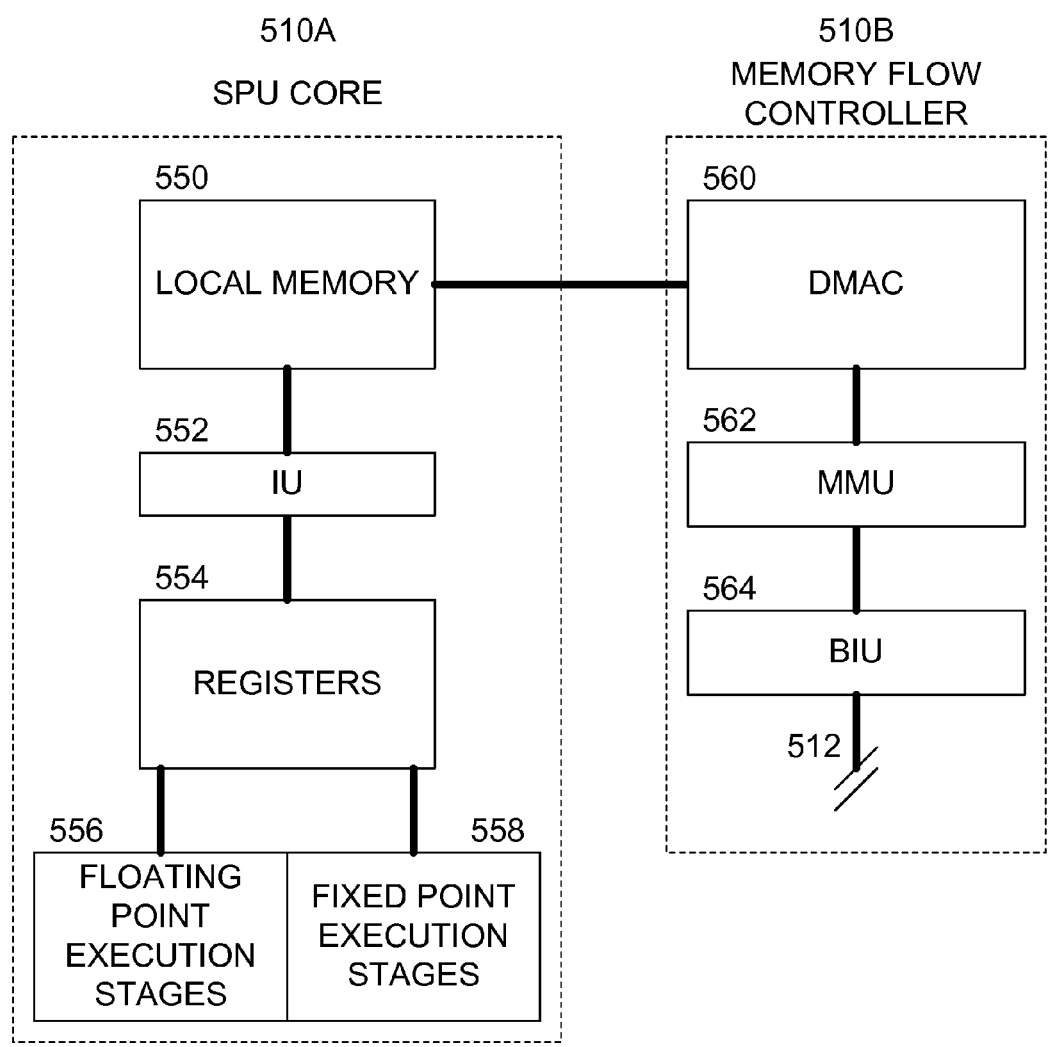
FIG. 8 is a diagram illustrating the structure of an exemplary sub processing unit (SPU) of the system of FIG. 7 that may be adapted in accordance with one or more further aspects of the present invention.

FIG. 8 illustrates the preferred structure and function of a sub processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one or more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide 264 bytes of effective address space with 4K-, 64K-, 1M-, and 16M-byte page sizes and 256 MB segment sizes. Preferably, the MMU 562 is operable to support up to 265 bytes of virtual memory, and 242 bytes (4 TeraBytes) of physical memory for DMA commands. The hardware of the MMU 562 may include an 8-entry, fully associative SLB, a 256-entry, 4way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 9:
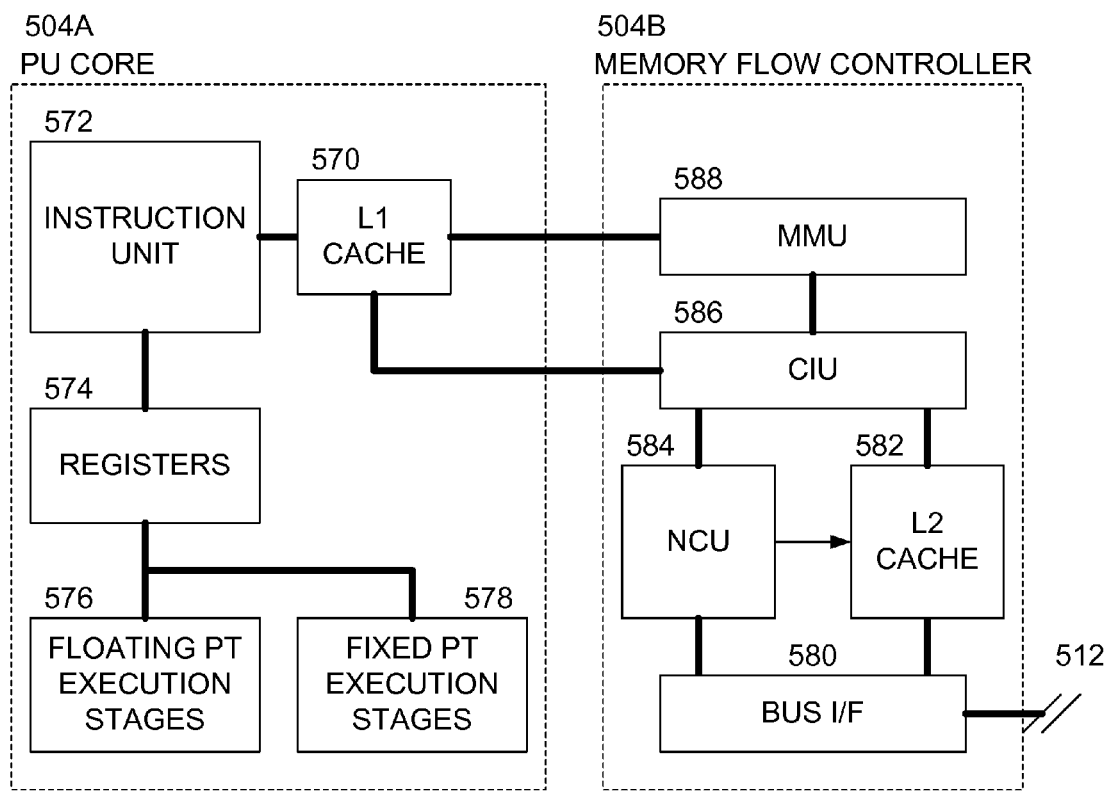
FIG. 9 is a diagram illustrating the structure of an exemplary processing unit (PU) of the system of FIG. 9 that may be adapted in accordance with one or more further aspects of the present invention.

FIG. 9 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queuing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for programming at least one trusted storage location using a direct memory access (DMA) command, comprising:
   entering a secure mode in which a given processor may initiate a transfer of information into or out of said given processor, but no external device may initiate a transfer of information into or out of said given processor;
   inserting one or more authorization codes, including a plurality of bits, into the DMA command prior to issuing the DMA command from said given processor, the one or more authorization codes requiring that the at least one trusted data storage location is to be one of read-only, write-only, readable and writeable, limited access, and reset; and
   programming the at least one trusted data storage location based on the one or more authorization codes of the direct memory access (DMA) command, wherein said at least one trusted data storage location is located external to said given processor.

2. The method of claim 1, wherein:
   read-only programming provides that one or more processors may only read contents of the trusted storage location if an accepted one or more authorization codes are presented in a subsequent DMA command;
   write-only programming, provides that one or more processors may only write contents into the trusted storage location if an accepted one or more authorization codes are presented in a subsequent DMA command;
   read/write programming provides that one or more processors may read or write contents of the trusted storage location if an accepted one or more authorization codes are presented in a subsequent DMA command;
   limited access programming provides that only a specified processor or processors may access the trusted storage location if an accepted one or more authorization codes are presented in a subsequent DMA command; and
   resetting a given trusted storage location provides for overriding a previously programmed condition.

3. The method of claim 1, further comprising:
   sending the DMA command from said processor to said trusted data storage location;
   interrogating said one or more authorization codes; and
   permitting programming of the at least one trusted data storage location if the one or more authorization codes satisfy one or more conditions.

4. The method of claim 3, wherein the one or more conditions are that the processor is in the secure mode.

5. The method of claim 4, further comprising permitting the given processor to insert the one or more authorization codes into the DMA command only when it is in the secure mode.

6. The method of claim 3, wherein the one or more conditions include that the given processor is a first processor to present the one or more authorization codes for programming the at least one trusted data storage location.

7. The method of claim 3, wherein:
   at least one of one or more trusted data storage locations and respective groups of such locations are associated with one or more program authority codes; and
   the one or more conditions include that the one or more authorization codes include a valid program authority code.

8. The method of claim 3, wherein:
   one or more processors may be associated with one or more processor IDs;
   the one or more conditions include that the one or more authorization codes include a valid processor ID.

9. The method of claim 2, wherein said limited access provides for prohibiting access to said at least one trusted data storage location by processors other than said given processor.

10. The method of claim 2, wherein said limited access provides for making said trusted storage location readable and writeable by said given processor and read-only by other processors.

11. The method of claim 1, further comprising:
establishing a virtual private network (VPN) between said given processor and a second processor;
encrypting said DMA command in accordance with said VPN; and
transmitting said encrypted DMA command over said VPN to said second processor.

12. The method of claim 11, further comprising decrypting said DMA command at said second processor and sending said DMA command from said second processor for interrogation.

13. The method of claim 1, further comprising performing said programming step before a transition from an authentication process of an application program to execution of the application program within the given processor.

14. An apparatus, comprising:
one or more trusted storage locations;
a plurality of processors capable of communicating with one another and the one or more trusted storage locations over one or more communication links; and
a control circuit associated with the one or more trusted storage locations and operable to facilitate programming at least one trusted data storage location by interrogating a direct memory access (DMA) command, wherein:
the DMA command includes one or more authorization codes, including a plurality of bits, that are inserted therein by a given one of the plurality of processors the one or more authorization codes requiring that the at least one trusted data storage location is to be one of read-only, write-only, readable and writeable, limited access, and reset,
the given one of the plurality of processors must have entered into a secure mode in order to insert the one or more authorization codes into the DMA command, where the secure mode requires that the given processor may initiate a transfer of information into or out of said given processor, but no external device may initiate a transfer of information into or out of said given processor, and
the control circuit operates to interrogate the DMA command by determining whether the one or more authorization codes are present in the DMA command and whether the one or more authorization codes specifies that the programming of the one or more trusted storage locations is to be one of read-only, write-only, readable and writeable, limited access, and reset.

15. The apparatus of claim 14, wherein the control circuit is operable to permit programming of the at least one trusted data storage location if the one or more authorization codes satisfy one or more conditions.

16. The method of claim 15, wherein at least one of:
the one or more conditions are that the processor is in the secure mode;
the one or more conditions include that the given processor is a first processor to present the one or more authorization codes for programming the at least one trusted data storage location;
at least one of one or more trusted data storage locations and respective groups of such locations are associated with one or more program authority codes, and the one or more conditions include that the one or more authorization codes include a valid program authority code; and
one or more processors may be associated with one or more processor IDs, and the one or more conditions include that the one or more authorization codes include a valid processor ID.

17. The apparatus of claim 16, wherein the one or more trusted data storage locations are memory mapped input/output hardware registers.

18. A processor operating under the control of an executable program that is capable of causing the processor to execute actions, comprising:
inserting one or more authorization codes, including a plurality of bits, into a direct memory access (DMA) command when the processor is in a secure mode of operation in which the processor may initiate a transfer of information into or out of said processor, but no external device may initiate a transfer of information into or out of said processor,
wherein the one or more authorization codes of the DMA command operate to specify that at least one trusted data storage location is to be programmed to be one of read-only, write-only, readable and writeable, limited access, and reset.

* * * * *